United States Patent Office 3,126,343
Patented Mar. 24, 1964

3,126,343
LUBRICANT CONTAINING PHOSPHITE ADDITIVE
Glenn R. Wilson, Cambridge, Mass.
(24 Concord, Boston, Mass.)
No Drawing. Original application May 26, 1958, Ser. No. 737,490. Divided and this application Sept. 16, 1960, Ser. No. 56,361
2 Claims. (Cl. 252—49.8)

This invention is directed to the subject of synthetic lubricant additives and more particularly to an organic phosphite lubricant which is effective to enhance the lubricating qualities of oil, either natural or synthetic, when added in very small quantities.

This invention is even more specifically directed to a compound which is designated chemically as 2,6-di-tertiary-butyl-4-methyl-phenyl phosphite and may be represented by the following structural formula.

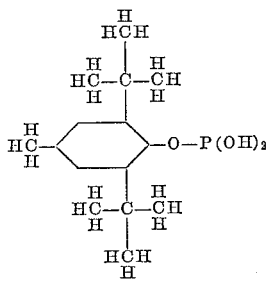

This compound has been prepared by the following synthesis:

A suspension of sodium methoxide in toluene is prepared by reacting 5.8 grams (0.25 mole) of sodium metal in 200 cubic centimeters toluene with 50 grams of methanol. When all the sodium has reacted the excess methanol is removed by distillation.

To the suspension of sodium methoxide is added 51.5 grams (0.25 mole) of 2,6-di-tertiary-butyl-4-methylphenol and the resulting mixture distilled to remove the displaced methanol. The suspension of sodium phenoxide is then reacted with 34.2 grams (0.25 mole) of phosphorus trichloride and refluxed for two to three hours.

The finely divided sodium chloride is removed by centrifugation or filtration and the filtrate treated with 5 cubic centimeters of water to hydrolyze the dichloro intermediate. Upon standing a crystalline solid separates (M.P. 157–8° C.).

The crude crystalline product is purified by adding it to 200 cubic centimeters of water, neutralizing with dilute aqueous sodium bicarbonate, filtering and acidifying the filtrate with concentrated hydrochloric acid at which time a white flocculent precipitate separates. Removing the precipitate and drying it yields a white crystalline material melting with decomposition at 165° C.

This material was analyzed for carbon, hydrogen and phosphorous and yielded 63.34 percent carbon, 8.86 percent hydrogen and 10.91 percent phosphorous. The corresponding theoretical values are 63.43 percent carbon, 8.86 percent hydrogen and 10.89 percent phosphorous.

As a check upon the value of this primary 2,6-di-tertiary-butyl-4-methyl-phenyl phosphite the tests tabulated below were performed upon a Shell four ball wear tester.

| Base Oil | Additive | Wear Scar Diameter (mm.) | |
|---|---|---|---|
| | | 10 kg. load | 40 kg. load |
| Pentaerythritol ester (Hercules 707). | None | 0.76 | |
| Do | 0.1% Diisopropyl hydrogen phosphite. | 0.31 | 1.00 |
| Do | 0.1% 2,6-di-tertiary-butyl-4-methyl-phenyl phosphite. | | 0.64 |
| 2-ethyl hexyl sebacate (Plexol 201). | None | 0.65 | |
| Do | 0.5% Tricresyl phosphate | 0.65 | |
| Do | 5.0% Tricresyl phosphate | 0.30 | |
| Do | 0.1% 2,6-di-tertiary-butyl-4-methyl-phenyl phosphite. | 0.38 | 0.61 |

NOTE.—Test conditions: 200° C., 600 r.p.m., 1 hour.

This application is a division of application Serial No. 737,490, filed May 26, 1958, and now abandoned.

I claim:
1. A lubricant composition consisting essentially of a base oil to which has been added about 0.1% of 2,6-di-tertiary-butyl-4-methyl-phenyl phosphite.
2. A lubricant composition consisting essentially of a base oil to which has been added 2,6-di-tertiary-butyl-4-methyl-phenyl phosphite in an amount effective for enhancing the lubricity of said oil, said amount being less than 0.5% of said composition.

References Cited in the file of this patent
UNITED STATES PATENTS

| | | |
|---|---|---|
| 2,220,851 | Schreiber | Nov. 5, 1940 |
| 2,470,405 | Leland | May 17, 1949 |
| 2,732,365 | Bill et al. | Jan. 24, 1956 |

OTHER REFERENCES

Christensen, "The Development of a Turbo-Prop Synthetic Lubricant," Lubrication Engineering, August 1952, pp. 177–179.